Patented May 15, 1951

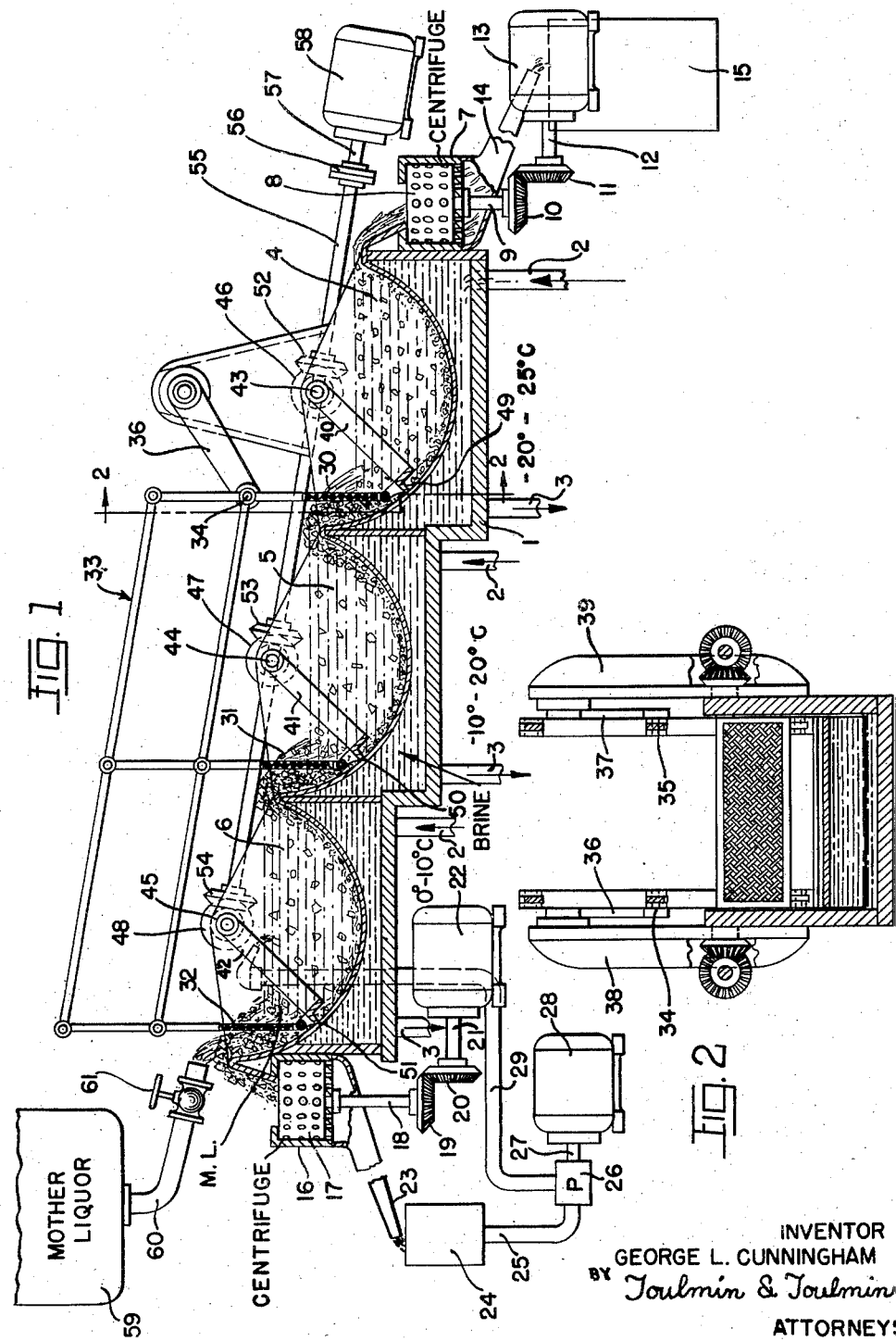

2,552,524

UNITED STATES PATENT OFFICE 2,552,524

APPARATUS FOR EXTRACTING LIQUID TO FORM A CONCENTRATE

George L. Cunningham, Dayton, Ohio, assignor to The Commonwealth Engineering Company of Ohio, Dayton, Ohio, a corporation of Ohio Application July 1, 1948, Serial No. 36,547

7 Claims. (Cl. 62—124)

The present invention relates to the concentration of solutions and, more particularly, is directed to an apparatus for extracting liquids from solutions to effect a concentration thereof.

The term "solution" as used herein is not limited to "true solutions" in the scientific sense, but also encompasses so called "practical solutions." Such "practical solutions" include solutions in which the solute is practically in suspension or in dispersion in an aqueous menstruum. Typical examples of "practical solutions" are milk, the juices of fruits and vegetables, maple, cane, beet and sorghum juices and syrups, body fluids and extracts of tissues, and any other substances which in their native state or in modified form contain water.

Four principal methods of bringing about a concentration of a solution have been practiced heretofore, which methods are:

(a) Solar evaporation,
(b) Evaporation by heating,
(c) Removal of water by vacuum with or without heating, and
(d) Freezing the liquid to be removed and eliminating the thus frozen liquid in form of ice.

The present invention deals with the freezing of the liquid to be removed and the elimination of the thus frozen liquid in the form of ice. While the apparatus according to the present invention is applicable to the concentration of any type of solutions containing liquid adapted to form solvent crystals, the invention will, for the sake of convenience, be described in connection with the extraction of water from fruit juices.

It is a well known phenomenon that the solute from dilute solutions tends to increase in concentration in the liquid portion of a partially frozen solution. This phenomenon has been made use of heretofore to extract the water from fruit juices. To this end a plurality of vessels or containers were set up which were used in progressive but separate steps in the following manner:

(a) First the fruit juice as squeezed out from fresh fruits is subjected to a freezing process. As a result thereof, relatively small ice crystals are formed. These crystals, which are frozen water, are then separated from the liquid in the container and removed therefrom.

(b) The remaining liquid constituting a concentrating solution is then transferred to the next container where it is again subjected to a freezing process, however to a temperature somewhat lower than the lowest temperature in the preceding step. Again ice crystals form which are subsequently separated and removed from the liquid concentrate.

(c) The thus further concentrated solution is then transferred to another container with the freezing and ice crystals removing steps continued as described before and so forth until the desired concentrate has been obtained.

The drawback of previously known methods consists primarily in that, since the crystals produced in rather dilute fruit juices are relatively small while their number is great, and crystals grown in more concentrated solutions are still smaller and their number is even greater, and thus the total area of the ice crystals is great. As a result thereof, it is unavoidable that a relatively large portion of the minerals, sugars, vitamins, etc., in the liquid are removed with the crystals. The thick layer of viscous mother liquor adheres to the surface of each crystal and is lost with the removal thereof.

It has been suggested to centrifuge the ice crystals of each container prior to their removal from the container to regain part of the layer of mother liquor surrounding each crystal. While this step reduces the thickness of the layer of mother liquor around each crystal, the mother liquor lost with the crystals is still considerable in view of the great number of small crystals present representing a considerable surface area, and the expense of these centrifuges makes the process unattractive economically.

Another known method of removing water from fruit juices makes use of the fact that frozen aqueous solutions, like frozen water itself, lower their melting points under pressure. To this end, only one container is provided in which the entire juice squeezed out from the respective fruits is completely frozen. This frozen mass is then subjected to high pressure with the result that the melting point of the frozen mass is lowered and part of the mass melts and becomes liquid. This liquid is then separated from the frozen mass and represents the concentrated product. Also, this method has the drawback that a considerable quantity of important minerals, sugars, vitamins, etc., will stay on the ice crystals and will be lost with the removal thereof, particularly since in this instance most of the ice crystals are small and numerous and a large portion of the ice crystals are very small and very numerous, therefore, present a large area. Consequently, also the removal of a considerable quantity of mother liquor with the ice is unavoidable. In addition thereto, this known method requires large quantities of energy which fact materially impairs the commercial application of this method. A further disadvantage is that, when the juice is extracted, the pressure will drop and the press will freeze up.

It is, therefore, an object of this invention to provide an apparatus for concentrating solutions which will overcome the drawbacks inherent to methods heretofore practiced.

It is another object to provide an apparatus for extracting liquids from solutions to be concentrated, which will allow the removal of such liquids without, to any practical extent, removing valuable minerals and other important ingredients from the original solution.

It is a further object to provide an apparatus for concentrating solutions, which will freeze the liquid to be removed, and will provide that only such ice crystals are removed from the solution which will have reached a predetermined minimum size. Also all the ice is removed at the highest temperatures used in the process, thus reducing the load on the refrigeration apparatus.

It is also an object of this invention to provide an apparatus for concentrating solutions, which is relatively simple in construction and highly economical in operation, and which will make it possible to carry out the concentrating process in continuous steps following each other automatically.

These and other objects and advantages of the invention will appear more clearly from the following specification in connection with the accompanying drawings, in which:

Figure 1 illustrates diagrammatically a longitudinal section through an apparatus according to the invention, while Figure 2 represents a section taken along the line 2—2 of Figure 1.

*Structural arrangement*

Referring now to the drawings in detail, the structure shown therein comprises a large container 1 divided into three compartments adapted to receive cooling brine. The cooling brine is introduced into each compartment through an inlet pipe 2 from any standard cooling device, and may be returned to such cooling device through an outlet pipe 3 connected to the container 1. The container 1 is sub-divided into a plurality of chambers, from a technical standpoint, the more chambers the better the operation, but from a commercial viewpoint this is more expensive, thus in the present instance the container is divided into three chambers 4, 5, and 6, respectively. As will be clear from the drawings, the chambers 4, 5, and 6 are so arranged that the chamber 6 is located highest, while the chamber 4 is located lowest, with the chamber 5 arranged at an intermediate level. In this way, the overflow of the chamber 6 will automatically pass into the chamber 5, while the overflow of the chamber 5 will automatically pass into the chamber 4.

The chamber 4 has associated therewith a container 7 having rotatably mounted therein a perforated drum 8, adapted to receive the overflow from the chamber 4. The perforations in the drum 8 are rather small, for a purpose to be explained later. The drum 8 is mounted on a shaft 9 having connected thereto a bevel gear 10, which meshes with a bevel gear 11 mounted on the shaft 12 of an electric motor 13. The botttom of the container 7 is likewise perforated and has connected thereto a discharge pipe 14 leading to a collecting chamber 15.

Similar to the lowest chamber 4, the highest chamber 6 has associated therewith a container 16 similar in construction to the container 7. The container 16 also has rotatably mounted therein a perforated drum 17 mounted on a shaft 18, which carries a bevel gear 19. The bevel gear 19 meshes with the bevel gear 20 connected to the motor shaft 21 of an electric motor 22. The container 16 also has a perforated bottom with a discharge pipe 23 connected thereto, which latter leads to a vessel 24. The vessel 24 has its bottom connected to a pipe 25 leading to a pump 26, which latter is driven through a shaft 27 of an electric motor 28. The pump 26, which may be of any standard type, is adapted to pump liquid from the vessel 24 through a conduit 29 back into the chamber 6.

Each of the chambers 4, 5, and 6 has associated therewith a grading screen 30, 31, and 32, respectively. These screens differ from each other in the size of the mesh, with the screen 30 having the smallest mesh i. e. capable of removing smallest crystals and the screen 32 having the largest mesh, while screen 31 has an intermediate mesh. Each of the screens 30, 31, and 32 is connected to a frame generally designated 33, which in its turn is pivoted at 34 and 35 to two arms 36 and 37, respectively. These arms 36 and 37 are in turn pivoted to braces 38 and 39, which are preferably connected to the floor supporting the apparatus. Also pivotally connected to the frame 33, adjacent the lower ends of the screens 30, 31 and 32, are rotating arms 40, 41, and 42, respectively. These arms are respectively connected to shafts 43, 44, and 45, each of which carries a bevel gear 46, 47, and 48, respectively. Connected to the free ends of the rotating arms 40, 41, and 42 are scrapers 49, 50, and 51, respectively. The longitudinal axes of the shafts 43, 44, and 45 are so located that they are concentric to the curvature of the bottom of the chambers 4, 5 and 6, so that the scrapers connected to the rotating arms will, during the rotation of said arms within the chambers, properly scrape the bottom of the chambers.

Each of the bevel gears 46, 47, and 48 meshes with a bevel gear 52, 53, and 54, respectively. Each of these bevel gears 52, 53, and 54 is arranged on a common shaft 55, which is connected through a clutch 56 with the shaft 57 of an electric motor 58. It will, therefore, be clear that operation of the motor 58 will cause the rotating arms 40, 41, and 42 to rotate, thereby also rotating the frame 33, while simultaneously causing the scrapers 49, 50, and 51 to scrape the bottom of the chambers 4, 5, and 6, respectively.

Each of the chambers 4, 5 and 6 is adapted to receive the mother liquor to be concentrated. The mother liquor, which may consist of the juice as it is squeezed out from fruits, is received in a container 59, the bottom of which has connected thereto a pipe 60 ending over the chamber 6. The pipe 60 is preferably provided with a valve 61 so that the flow of mother liquor to the chamber 6 may be adjusted and, if desired, may also be interrupted.

*Operation*

The working of the apparatus according to the present invention will best be understood from a description of a complete operating cycle. To this end, it may be assumed that the container 59 is filled with fruit juice to be concentrated, while the valve 61 is closed. To start the operating cycle, the operator first opens the valve 61 so that the mother liquor will pass from the container 59 into the chamber 6. When the chamber 6 is filled, the overflow will pass to the chamber 5, and fill up the latter. After this chamber has been filled, the overflow will fill the chamber 4. As soon as this chamber is nearly filled, the valve 61 will be temporarily closed.

It is furthermore assumed that the container 1 was previously filled with cooling brine, which is held at such a temperature that the chamber 4 is subjected to a temperature between —20° and —25° centigrade, while the chamber 5 has a temperature between minus (—) 10° and minus (—) 20° centigrade, and the temperature in the chamber 6 is between 0° and minus (—) 10° centigrade. It is to be understood that the temperatures just mentioned are merely arbitrary, and will vary according to the solution to be treated and the number of treating chambers. In view of the temperature prevailing in the various chambers, ice crystals will form in these chambers. These ice crystals are relatively small and may in some cases average 1 to 2 millimeters in length.

After such ice crystals have formed, the motors 13, 22, 28 and 53, are started. As a result thereof, the drums 8 and 17, actually representing a centrifuge, will start operation, while the pump 26 begins to pump and the shaft 55 will rotate. Rotation of the shaft 55 causes the rotating arms 40, 41 and 42 to rotate, so that the scrapers 49, 50 and 51 connected thereto, will scrape the bottom of the vessels 4, 5 and 6, respectively. Inasmuch as these rotating arms are connected with the frame 33 carrying the scrapers, it will be obvious that the screens 30, 31 and 32 will also rotate, thus shoving in front of them the crystals formed in the respective chambers. During this operation of the screens, those crystals being able to pass through the screens will return to the respective vessels, while the larger crystals not being able to pass through the screens will move to the next container.

More specifically, during this operation, those crystals of container 4 which have a size larger than the openings in the screen 30 will be transferred by the screen 30 from the container 4 into the container 5. Similarly, those crystals of the container 5 which have a size larger than the size of the holes in the screen 31 will be moved from the chamber 5 into the chamber 6. Under similar conditions, the larger crystals of the chamber 6 will be transferred to the centrifuge or drum 17. The crystals moving in counter-flow are progressively larger and larger.

The crystals transferred from the chamber 4 to the chamber 5 will be allowed to grow further in the chamber 5, and, similarly, the crystals transferred from the chamber 5 to the chamber 6 will be allowed to grow further in the chamber 6. After a predetermined time, the crystals in the chamber 6 will have grown to a size averaging 1 to 2 centimeters in length.

It is a well known fact that crystal nuclei are more easily formed in the more concentrated solution, and their growth is relatively slower. Thus, it is an advantage to have all the crystal nuclei start in the more concentrated solutions and then to move these small crystals to more dilute solutions where they can grow into larger crystals. Nuclei carried over by concentrated liquor from tank 4 are recovered in centrifuge 7 and may be returned to tank 4 by suitable means such as a belt conveyor or drag line operating upon an inclined surface.

While this transfer of crystals is taking place, the valve 61 is opened, either manually or automatically, so that further mother liquor enters the various chambers. In this way, the liquid flowing downstream from the chamber 6 to the chamber 4 is meeting the crystals which are transferred upstream. Therefore, the crystals being transferred upstream will be washed by the oncoming liquor, which thus will reduce the viscous layer of the solute around the various crystals.

From the above, it will be clear that the chamber 4 contains the highest concentration of the solution, while the chamber 6 contains the lowest concentration of the solution. Furthermore, on an average the crystals in the chamber 4 are smallest, while the largest crystals are in the chamber 6.

After the transfer of some of the crystals from the chamber 4 to the chamber 5, and from the chamber 5 to the chamber 6, and from the chamber 6 to the drum 17 has been completed, the valve 61 may again be closed, either manually or automatically, for a predetermined time, thereby allowing the crystals transferred from chamber 4 to chamber 5 to grow in the latter, while similarly the crystals transferred from the chamber 5 to the chamber 6 are given a chance to grow in the chamber 6. In the meantime, the drum 17 is centrifuging the crystals transferred from the chamber 6 to the drum 17, thereby separating the non-frozen liquid adhering to the ice crystals from said crystals, which latter are removed from the drum, while the non-frozen liquid flows through the pipe 23 into the vessel 24. From here the liquid is pumped by the pump 26 through the conduit 29 back into the chamber 6.

The mixture of liquid and crystals passing from the chamber 4 into the drum 8 is likewise centrifuged, so as to separate the small ice crystals from the concentrate surrounding the same. It will be appreciated that the small openings in the drums 17 and 8 vary in size, the openings in the drum 8 being materially smaller than the openings in the drum 17. The openings in these drums are such that the drum 8 will retain very small crystals, while the drum 17 will retain crystals only of a size slightly less than the size of the crystals as they are finally removed from the process, which, as previously stated, may in some cases have a length of 1 to 2 centimeters.

As will be clear from the above, the apparatus according to the present invention allows:

(a) First, the formation of small crystals in the chambers 6, 5, and 4, while the liquid is passing downstream from the chamber 6 to the chamber 4. This constitutes the first half-cycle of the method carried out by the apparatus according to the invention.

(b) Then, the apparatus begins its transferring action, transferring the ice crystals upstream from the chamber at the lowest level in steps to the chamber at the highest level. These crystals are constantly growing larger and larger as they pass into more and more dilute solutions.

(c) During each transferring operation the crystals are washed in counter-current to reduce the viscous layer of the mother liquor around the crystals.

(d) Finally, the concentrated liquid is separated from the small crystals in the centrifuge adjacent the chamber of the lowest level, and is collected in a collector for the concentrated solution, while the centrifuge adjacent the chamber of the highest level separates the grown crystals from the mother liquor, and allows the removal of the said grown crystals.

While the apparatus according to the present invention has been described by setting forth in detail two individual half-cycles, namely the downstream operation and the upstream operation, it is, of course, understood that in practice these cycles overlap with the cycles of continuously oncoming fresh amount of mother liquor and ice crystals. In other words, it is not necessary that the valve 61 be alternately opened and closed. By properly adjusting the valve 61, and controlling the speed of the rotating arms operating the scrapers and the screens in each treating chamber, it is possible to maintain the valve 61 open so that a continuous flow of the mother liquor from the container 59 may be maintained, while continuous operation of the apparatus according to the invention is sustained.

It will also be understood that the present invention is by no means limited to the specific arrangement and construction illustrated in the drawings by way of example only, but also comprises any modification within the scope of the appended claims.

I claim:

1. In combination in an apparatus for extracting water from a solution of water and solids comprising means for conveying a solution; means for progressively decreasing the temperature of the solution through a series of temperature changes to cause freezing of the water in the solution by stages in separate bodies; means of moving ice crystals so formed in a counterflow direction from stage to stage; means of screening the crystals as they are moved step by step upstream from each stage of freezing; means of extracting the mother liquor from the crystals as they are discharged from the upstream end; and means of returning the liquor free of crystals to the upstream end.

2. In a machine, a series of containers arranged to overflow one into the other, means for supplying a solution at the upstream end of said series of containers, means for progressively reducing the temperature on the succession of the containers and the contents thereof, means of moving ice crystals upstream from one container to the other, and means of screening the crystals according to size as they are moved from one container to the other.

3. In a machine, a series of containers arranged to overflow one into the other, means for supplying a solution at the upstream end of said series of containers, means for progressively reducing the temperature on the succession of the containers and the contents thereof, means of moving ice crystals upstream from one container to the other, means of screening the crystals according to size as they are moved from one container to the other, means of removing residual mother liquor from the crystals as discharged from the upper end of the first container and returning the liquor free of crystals to the first of the containers.

4. In combination in an apparatus for concentrating solutions, a plurality of chambers adapted to receive solutions to be treated, means associated with said chambers for creating temperatures therein progressively lower than 0° centigrade in the direction of liquid flow, means for transferring solution with ice crystals therein from one chamber to another chamber in a predetermined direction, means associated with each of said chambers for scraping the bottom of said chambers and for transferring ice crystals from one chamber to another chamber in a direction opposite to said predetermined direction, and means associated with said last mentioned means for grading said ice crystals to prevent transfer of ice crystals of less than a predetermined minimum size in said last mentioned direction.

5. An apparatus for concentrating solutions which comprises in combination, a plurality of chambers, said chambers being arranged in series at different levels so as to cause the overflow of one chamber to pass into the next chamber, freezing means associated with each of said chambers for causing the formation of ice crystals in solutions received by said chambers, each of said chambers having associated therewith screen means of different mesh adapted to move adjacent the bottom of said chambers, and means connected with said screen means to actuate the same for transferring ice crystals from solution in one chamber to another chamber in a direction opposite to the direction of flow of said overflow.

6. An apparatus for concentrating solutions comprising in combination, a plurality of chambers adapted to receive water solutions, means associated with each of said chambers for causing the formation of ice crystals in each of said chambers, said chambers being arranged to allow flow of solution from one chamber to another chamber in a predetermined direction, grading means associated with each of said chambers for transferring ice crystals of a predetermined minimum size from one chamber to another chamber in a direction opposite to said predetermined direction, the grading means associated with one chamber being different from the grading means of the next chamber with regard to the grading of the minimum size of crystals to be transferred, and means associated with the first and last chamber for separating liquid surrounding ice crystals from the latter.

7. In combination in an apparatus for concentrating solutions, a plurality of chambers arranged in series for receiving solutions to be concentrated, said chambers being arranged to allow the flow of solution from one chamber to another in a predetermined direction, means associated with said chambers causing the formation of solvent crystals in the solution received by said chambers, transferring means associated with each of said chambers for moving solvent crystals of a predetermined minimum size from one chamber to the next chamber in a direction opposite to said predetermined direction and screening means of different mesh associated with said transferring means for grading the crystals to be transferred in said last mentioned direction.

GEORGE L. CUNNINGHAM.

REFERENCES CITED

The following references are of record in the file of this patent:

UNITED STATES PATENTS

| Number | Name | Date |
| --- | --- | --- |
| 1,004,858 | Dow | Oct. 3, 1911 |
| 1,359,911 | Oman | Nov. 23, 1920 |
| 1,576,137 | Johnson | Mar. 9, 1926 |
| 2,186,887 | Steinbacher | Jan. 9, 1940 |
| 2,337,317 | Eggert | Dec. 21, 1943 |